United States Patent [19]
Furuya et al.

[11] Patent Number: 5,097,623
[45] Date of Patent: Mar. 24, 1992

[54] APPARATUS FOR CULTIVATING MUSHROOMS

[75] Inventors: Kenji Furuya; Toyotaka Okada, both of Nagano, Japan

[73] Assignee: Saishin Co., Ltd., Nagano, Japan

[21] Appl. No.: 518,327

[22] Filed: May 4, 1990

Related U.S. Application Data

[63] Continuation of Ser. No. 268,500, Nov. 8, 1988, abandoned.

[30] Foreign Application Priority Data

Mar. 7, 1988 [JP] Japan .................. 63-53322

[51] Int. Cl.$^5$ .............................................. A01G 1/04
[52] U.S. Cl. .......................................................... 47/1.1
[58] Field of Search ............................. 47/1.1, 58

[56] References Cited

U.S. PATENT DOCUMENTS

| | | | |
|---|---|---|---|
| 2,723,493 | 11/1955 | Stoller | 47/1.1 |
| 3,453,775 | 7/1969 | Ware | 47/58 |
| 3,810,327 | 5/1974 | Giansante | 47/1.1 |
| 3,820,278 | 6/1974 | Giasante | 47/1.1 |
| 3,999,329 | 12/1976 | Brais | 47/17 |
| 4,267,664 | 5/1981 | Henks | 47/1.1 |

FOREIGN PATENT DOCUMENTS

| | | | |
|---|---|---|---|
| 1582809 | 3/1971 | Fed. Rep. of Germany | 47/1.1 |
| 49-17099 | 4/1974 | Japan | 47/1.1 |
| 52-107947 | 9/1977 | Japan | 47/1.1 |
| 58-22171 | 5/1983 | Japan | 47/1.1 |

*Primary Examiner*—James R. Feyrer

[57] ABSTRACT

A mushroom cultivation apparatus includes an air suction fan or a vacuum pump which suctions air in all or part of an incubation chamber, a budding chamber and a plurality of suppressing and growing chambers, which are required for cultivation of mushrooms, to reduce pressure in the chambers so that concentration of carbonic acid gas in a cultivation bottle in the cultivation chamber, the budding chamber and the plurality of suppressing and growing chambers is reduced to a predetermined concentration or less, preferably to a 15% concentration or less. Thus, carbonic acid gas in the cultivation bottle is forceably exhausted to adjust the concentration of carbonic acid gas in the cultivation bottle to an optimum condition.

14 Claims, 3 Drawing Sheets

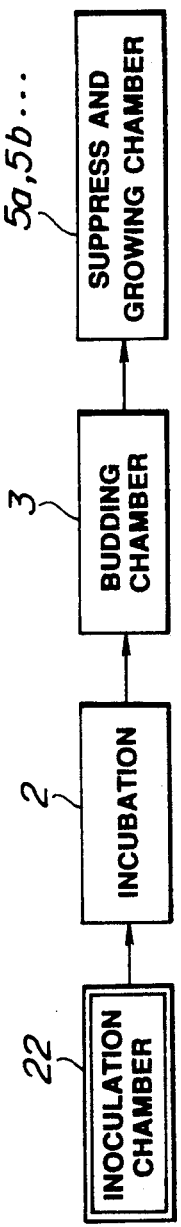
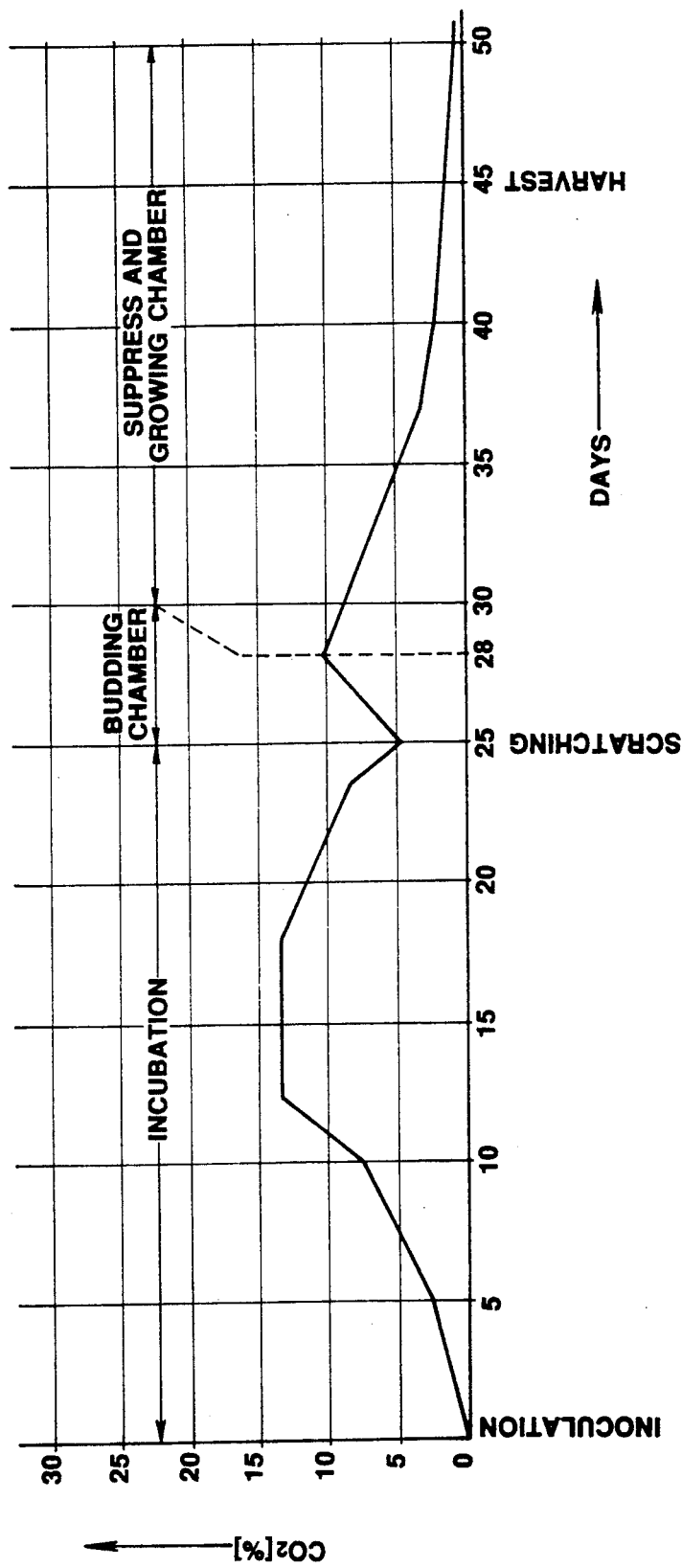

APPARATUS FOR CULTIVATING MUSHROOMS

This application is a continuation of application Ser. No. 07/268,500 filled on Nov. 8, 1988, now abandoned.

BACKGROUND OF THE INVENTION

1. Field of the Invention

The present invention relates to an apparatus for cultivating mushrooms such as by Enoki mushrooms.

2. Description of the Relevant Art

Generally, mushrooms are aerobic fungi and must be well ventilated in cultivation. Particularly, excess carbonic acid gas is produced in the growing process of spawn and normal growing of mushrooms is accordingly deteriorated. It is necessary to reduce the concentration of carbonic acid gas as low as possible in the growing process of spawn and even in the growing of mushrooms.

Thus, in the artificial cultivation of mushrooms, reducing the concentration of carbonic acid gas is an important subject in order to improve the yield and the quality of mushrooms. Heretofore, ventilation of a cultivation chamber is made by an air sending apparatus having a ventilation fan.

However, although the ventilation of the cultivation chamber can be made by the air sending apparatus with ventilation fan, the concentration of carbonic acid gas in a cultivation bottle is only minimally reduced and its practical effect can not be increased. The problem is particularly severe when using a cultivation bottle. By way of reference, a cultivation bottle is a type of bottle conventionally used in the cultivation of Enoki mushrooms. The bottle is generally a 1000 CC plastic bottle in which a culture ground is contained, and includes an opened upper portion. While a method in which oxygen is force fed into the cultivation chamber is also known, it is very expensive and impractical.

SUMMARY OF THE INVENTION

It is an object of the present invention to provide a mushrooms cultivation apparatus which can reduce the concentration of carbonic acid gas in a cultivation bottle, which has not been sufficiently reduced by simple ventilation, and can provide an increased yield and an improved quality of mushrooms.

Further, it is another object of the present invention to provide a mushroom cultivation apparatus which does not require any special facilities and is inexpensively and easily implemented.

In order to achieve the above objects, the present invention provides a mushroom cultivation apparatus 1 including cultivation chambers, that is, an incubation chamber 2, a budding chamber 3 and a plurality of suppressing and growing chambers 5a, 5b, and 5c, . . ., and air suction means 6 and 7 which suck air from all or part of the chambers 2, 3, 5a, 5b, and 5c, . . . to reduce pressure in the chambers so that concentration of carbonic acid gas in at least the cultivation bottles is reduced to a predetermined concentration or less. In this case, at least one air suction means 6 can be connected to all or part of the chambers 2, 3, 5a, 5b, and 5c through a branch duct 8, and further there can be provided air conditioning means 10 which adjusts temperature and/or humidity of air flowing into the chambers 2, 3, 5a, 5b, and 5c on the basis of the air suction means 6 and 7.

Accordingly, when air in the cultivation chambers is forceably sucked by the air suction means 6 and 7, the air pressure in the chambers is reduced to a pressure less than the atmospheric pressure. Consequently, carbonic acid gas in the cultivation bottles can also be exhausted and the concentration thereof in the cultivation bottles can be reduced. At this time, if an amount of air sucked by the air suction means 6 and 7 is controlled, the concentration of carbonic acid gas can be adjusted to an optimum condition, and further temperature or humidity of air flowing into the chambers can be adjusted to an optimum condition by the air conditioning means 10.

BRIEF DESCRIPTION OF THE DRAWINGS

FIG. 2 is a process diagram of the mushroom cultivation chamber of FIG. 1, in which each process is represented for each chamber;

FIG. 3 is a characteristic diagram showing a concentration of carbonic acid gas in a cultivation bottle and with respect to the cultivation time;

DETAILED DESCRIPTION OF THE PREFERRED EMBODIMENTS

An embodiment of the present invention in the best mode is now described in detail with reference to drawings.

Figure 1:
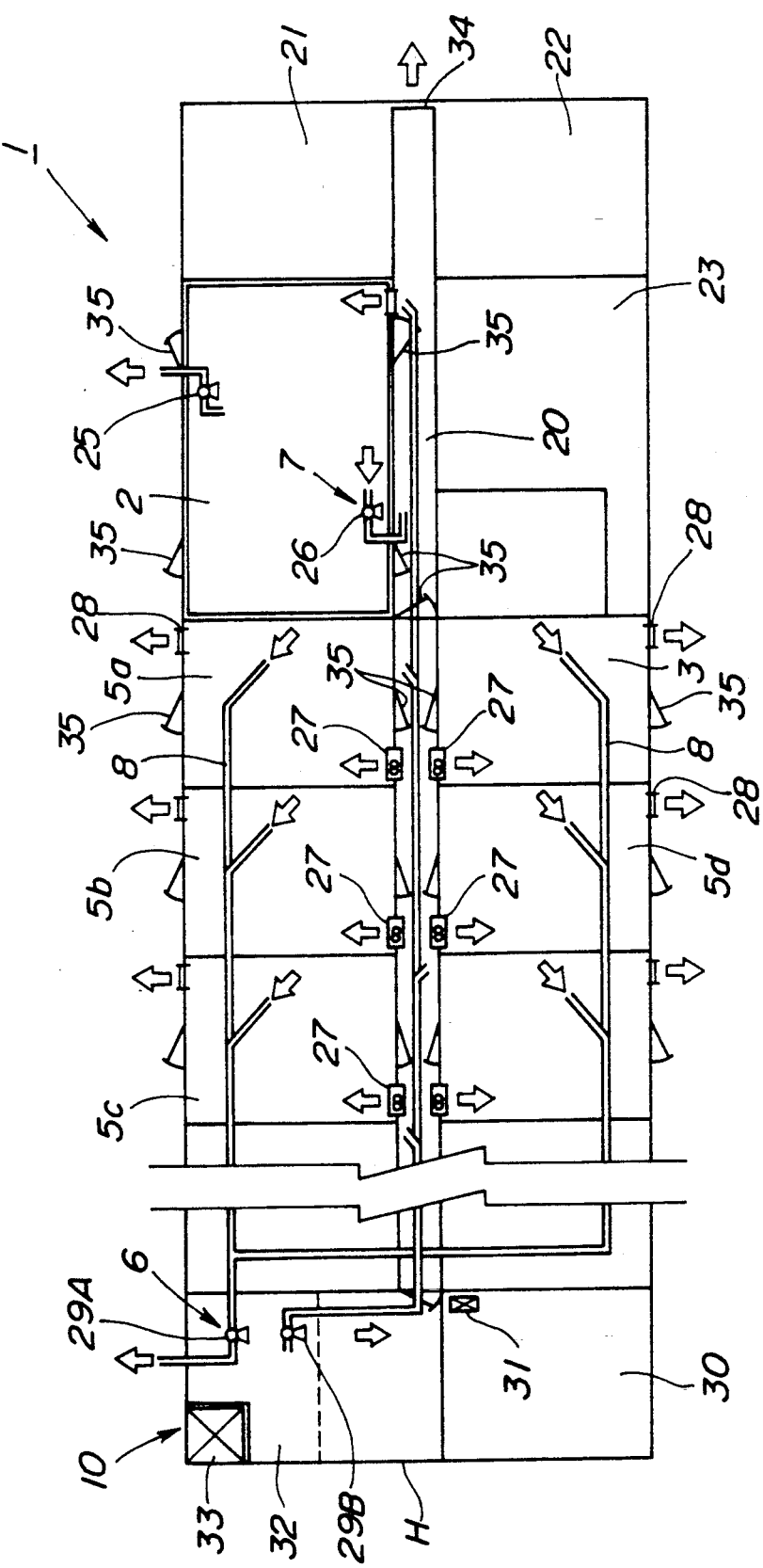
FIG. 1 schematically illustrates a structure of a mushroom cultivation apparatus according to the present invention.

Referring to FIG. 1, a structure of a mushroom cultivation apparatus 1 according to the present invention is now described.

The cultivation apparatus illustrated by reference numeral 1 is formed of a cultivation house H which is substantially sealed as a whole. The cultivation house H is partitioned into a plurality of substantially sealed cultivation chambers and includes a passage 20 formed at the center thereof in a longitudinal direction. The cultivation chambers include a seed chamber 21 and inoculation chambers 22 and 23.

An incubation chamber 2 is provided and includes an exhaust fan 25 and a suction fan 26. The exhaust fan 25 is used for ordinary ventilation and serves to exhaust air from the chamber. The suction fan 26 constitutes the air suction means 7 and controls the air pressure in the chamber. Air in the chamber is exhausted to the passage 20. Such a suction fan can be implemented by utilizing a sirocco fan having a relatively large suction capability. Air pressure in the incubation chamber 2 can be reduced by operation of the suction fan 26.

A budding chamber 3 and a plurality of suppressing and growing chambers 5a, 5b, and 5c, . . . can be formed into a substantially identical structure. The suppressing and growing chamber is needed to suppress excessive extension of the mushroom which causes weakness and to facilitate the growth of late growing mushrooms. Each of the budding chamber 3 and the suppressing and growing chambers 5a, 5b, and 5c are provided with a ventilation fan 27 disposed between the passage 20 and the corresponding chamber and with a control window 28 disposed between the outside and the corresponding chamber and which can be opened closed. Further, each of the chambers 3, 5a, 5b, and 5c includes a flow control valve if necessary and an opening end of a branch duct 8 is disposed in each of the chambers 3, 5a, 5b, and 5c so that an amount of suction air can be adjusted for each chamber, a combined end of the duct 8 being connected with a vacuum pump 29A to form the air suction means 6. Accordingly, when the vacuum pump 29A is operated, air in each of the chambers can be suctioned and the air pressure in each of the chambers can be reduced.

Further, a control chamber 30 includes an inverter panel 31. The inverter panel 31 is a control panel for measuring the air pressure, the concentration of oxygen and the concentration of carbonic acid gas in each of the chambers 2, 3, 5a, 5b, and 5c and/measuring the air pressure, the temperature and the humidity in each of the chambers to control them. Further, an air conditioning chamber 32 includes an air conditioning device 33. The air conditioning chamber forms a continuous air conditioned space which communicates with the passage 20. Further, the air conditioning chamber 32 is filled with air having the temperature and/or humidity conditioned by the air conditioning device 33 and further air in the chamber 32 which is conditioned to an optimum condition can be distributed to the incubation chamber 2 and each of the chambers 3, 5a, 5b, and 5c, through a duct in the passage 20 by means of a blower 29B. In FIG. 1, reference numeral 34 denotes a filter for ventilation and 35 denotes a doorway.

Referring now to FIGS. 2 to 5, description is made to the method of cultivating mushrooms by using the cultivation apparatus 1, taking the Enoki mushrooms as an example.

First, in the inoculation process, the inoculation is made in the inoculation chambers 22 and 23 which are sterilized chambers.

Figure 4:
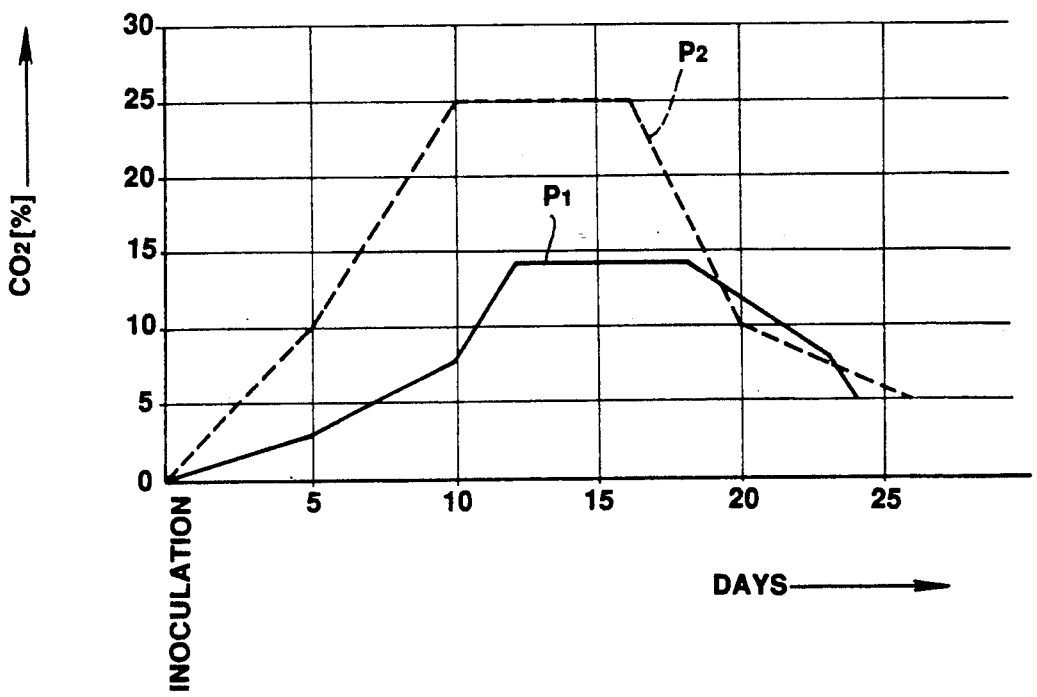
FIG. 4 is a characteristic diagram showing a concentration of carbonic acid gas in a cultivation bottle with respect to the cultivation time.

Then, the process proceeds to the incubation process and cultivation bottles of which inoculation has been completed are moved into the incubation chamber 2 and subjected to incubation for about 25 days (FIG. 3). At this time, since a substantial amount of carbonic acid gas is produced with the incubation of the spawn, the exhaust fan 25 is operated to provide ventilation and at the same time the suction fan 26 is operated. The suction fan 26 is operated intermittently, for example, so that the air pressure in the incubation chamber 2 is reduced. The concentration of carbonic acid gas in the cultivation bottles is controlled not to exceed about a concetration 15% by the reduction of the pressure in the chamber 2. In this case, a correlation between the pressure and the concentration of carbonic acid gas in the cultivation bottles is previously obtained and accordingly the pressure is controlled to be set to about −24 mm AQ or 18.24 mm HG which is basically near a peak thereof. Consequently, the concentration of carbonic acid gas is maintained at a target value as shown by a characteristic curve P1 in FIG. 4. Another characteristic curve P2 in FIG. 4 shows the concentration of carbonic acid gas in the prior art method in which the pressure in the chamber is not reduced, and in this case the concentration of carbonic acid gas in the cultivation bottles increases to about a concentration 25% at the maximum.

When the incubation process has been completed, the process proceeds to the budding process. That is, a scratching operation occurs after the incubation of spawn whereby innoculated spawn seeds are scratched or raked to facilitate the generation of sprouts. The reason why the budding process is not made in the suppressing and growing chamber is because carbonic acid gas is reduced effectively since much carbonic acid gas is produced after the scratching. In other words, at the beginning of the budding process, uniformity of the budding and severe control of the humidity on the surface of a spawn bed and the temperature in the chamber and the like are required. Further, in order to attain the uniformity of the budding for each cultivation bottles in the same process, about three days in the budding chamber 3 at the beginning of the budding process is very important.

In this case, air in the budding chamber 3 is suctioned by operation of the vacuum pump 29A to reduce the pressure in the chamber so that increase of concentration of carbonic acid gas in the cultivation chamber is suppressed as far as possible.

Figure 5:
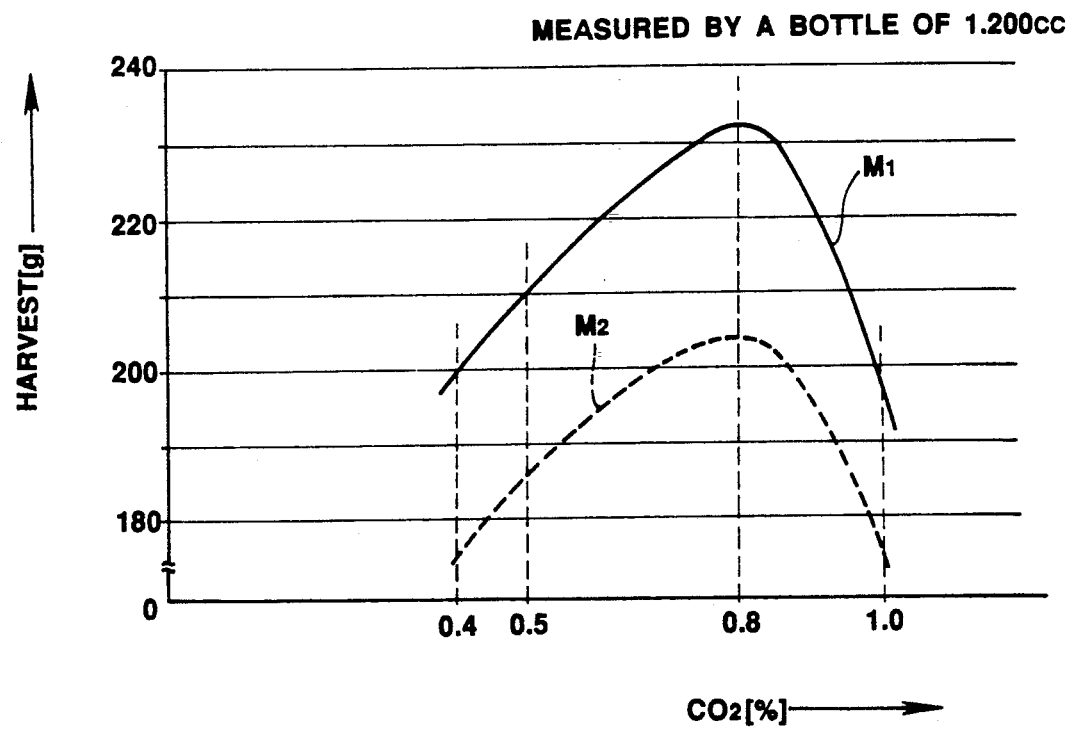
FIG. 5 is a characteristic diagram showing the harvest of mushrooms with respect to the concentration of carbonic acid gas in a suppressing and growing chamber.

When the budding process has been completed, the process proceeds to the suppressing and growing process. A plurality of suppressing and growing chambers 5a, 5b, and 5c, are provided and the suppressing and growing processes occur in the same chamber. In this case, the suppressing and growing processes are achieved by controlling the environment thereof. In other words, control of the pressure, the temperature and the humidity in the chamber is reached for each chamber by the air suction through the vacuum pump 29A to obtain the optimum cultivation condition. Further, even in the suppressing and growing chambers 5a, 5b, and 5c suppression of the concentration of carbonic acid gas in the cultivation bottle is controlled in the same manner as in the budding chamber 3. The concentration of carbonic acid gas at this time is preferably set to about an 0.8% concentration as shown in FIG. 5. A substantially increased harvest is obtained at this concentration. Particularly, a harvest exceeding 230 grams can be obtained for the Enoki mushrooms to which the incubation and budding processes according to the present invention have been applied and an increase of about 10 to 20 percent is attained as compared with the harvest of 200 grams for the Enoki mushrooms obtained by the conventional method. In FIG. 5, M1 represents a characteristic curve according to the present invention and M2 represents a curve according to the conventional method.

Further, ventilation is made for each process if necessary. Air flows into each of the chambers in any case of air suction by the air suction means and ventilation of the ventilation means, while since the temperature and the humidity of the air flowing into each of the chambers is previously set to the optimum condition by the air conditioning device 33 and the air fills the air conditioning chamber 32, air in the optimum condition rapidly fed into each of the chambers.

While the embodiment has been described in detail as above, the present invention is not limited to the embodiment. For example, the present invention can be applied to any kind of mushroom. Further, the configuration, quantity, numeral value and the like can be varied without departing from the gist of the present invention.

We claim:

1. A method for cultivating mushrooms, comprising the steps of:
   (a) designating a plurality of chambers to include a culture chamber, a budding chamber, and a suppressing and growing chamber;
   (b) providing a cultivation bottle in said culture chamber;

(c) hermetically sealing each of said plurality of chambers;

(d) expelling air from at least said culture chamber in a hermetically sealed condition; and (e) restoring atmospheric pressure to said culture chamber subsequent to expelling air therefrom, whereby an atmospheric condition is achieved having a relatively reduced concentration of carbonic acid gas as compared to a condition in said hermetically sealed culture chamber prior to expelling air therefrom thereby reducing a concentration of carbonic acid gas in the cultivation bottle to a 15% concentration or less.

2. An apparatus for cultivating mushrooms, comprising:

at least one cultivation bottle in a culture chamber;

a budding chamber;

a suppressing and growing chamber;

means for hermetically sealing each of said budding, suppressing and growing chambers;

air suction means for expelling air from at least said culture chamber in a hermetically sealed condition; and means for replenishing atmospheric pressure to said culture chamber subsequent to expelling air therefrom, in step fashion, whereby a normal atmospheric condition is introduced having a relatively reduced concentration of carbonic acid gas as compared to a condition in said culture chamber prior to expelling air therefrom;

whereby said air suction means and said means for replenishing, respectively, occur sequentially thereby reducing a concentration of carbonic acid gas in the cultivation bottle to a 15% concentration or less.

3. An apparatus for cultivating mushrooms according to claim 2, wherein said air suction means includes a vacuum pump and a duct for communicating said vacuum pump with each of the chambers.

4. An apparatus for cultivating mushrooms according to claim 2, wherein said air suction means includes an air suction fan.

5. An apparatus for cultivating mushrooms, according to claim 2, wherein said air suction means includes branch ducts which connect a plurality of chambers including an incubation chamber, the budding chamber and the suppressing and growing chamber.

6. An apparatus for cultivating mushrooms according to claim 5, further including air conditioning means for selectively conditioning temperature and humidity of air flowing into the incubation chamber, the budding chamber and the suppressing and growing chamber.

7. An apparatus for cultivating mushrooms according to claim 6, wherein said air conditioning means distributes conditioned air into each of the chambers.

8. An apparatus for cultivating mushrooms, comprising:

a plurality of chambers, said plurality of chambers being separately designated to accommodate stages of mushroom growth;

a cultivation bottle, provided in at least one of said plurality of chambers, for housing mushrooms in at least one of the stages of mushroom growth;

means for hermetically sealing at least said chamber having a cultivation bottle provided therein;

air suction means for expelling air from said hermetically sealed chamber, whereby the concentration of carbonic acid gas escapes from said cultivation bottle into said hermetically sealed chamber upon exhaustion of air therefrom; and means for restoring atmospheric pressure to said hermetically sealed chamber subsequent to expelling air therefrom, in step fashion, whereby an atmospheric condition is achieved having a relatively reduced concentration of carbonic acid gas as compared to a condition in said hermetically sealed chamber prior to expelling air therefrom;

whereby said air suction means and said means for restoring, respectively, occur sequentially thereby reducing a concentratration of carbonic acid gas in said cultivation bottle to a 15% concentration or less.

9. An apparatus for cultivating mushrooms according to claim 8, wherein said air suction means includes a vacuum pump and a duct for communicating said vacuum pump with each of said plurality of chambers.

10. An apparatus for cultivating mushrooms according to claim 8, wherein said air suction means includes an air suction fan.

11. An apparatus for cultivating mushrooms according to claim 8, wherein said plurality of chambers include a culture chamber, a budding chamber, and a suppressing and growing chamber corresponding to the stages of mushroom growth.

12. An apparatus for cultivating mushrooms according to claim 11, wherein said at least one cultivation bottle is within the culture chamber and said air suction means is for expelling air from said culture chamber.

13. An apparatus for cultivating mushrooms according to claim 11, wherein said air suction means includes branch ducts which are in fluid communication with each of said culture chamber, budding chamber, and suppressing and growing chamber.

14. An apparatus for cultivating mushrooms according to claim 13, further including air conditioning means for selectively conditioning both temperature and humidity of air flowing into said culture chamber, budding chamber, and suppressing and growing chamber.

* * * * *